United States Patent [19]

Hayashi

[11] 4,320,019
[45] Mar. 16, 1982

[54] MULTI-PURPOSE ADDITIVE COMPOSITIONS AND CONCENTRATES CONTAINING SAME

[75] Inventor: Katsumi Hayashi, Mentor, Ohio

[73] Assignee: The Lubrizol Corporation, Wickliffe, Ohio

[21] Appl. No.: 896,864

[22] Filed: Apr. 17, 1978

[51] Int. Cl.³ .............................................. C10M 1/32
[52] U.S. Cl. .................... 252/51.5 A; 260/326.5 F; 260/326.5 FM; 585/381; 585/379; 585/285; 585/18
[58] Field of Search ................................ 252/51.5 A

[56] References Cited

U.S. PATENT DOCUMENTS

| | | | |
|---|---|---|---|
| 3,219,666 | 11/1965 | Norman | 252/51.5 A |
| 3,403,011 | 9/1968 | Sweeney | 44/62 |
| 3,432,479 | 11/1969 | Verdol et al. | 252/51.5 A |
| 3,513,095 | 5/1970 | Love et al. | 252/51.5 A |
| 3,637,610 | 1/1972 | Jacobson | 252/51.5 A |
| 3,652,239 | 5/1972 | Sweeney et al. | 44/62 |
| 3,691,078 | 9/1972 | Johnston et al. | 252/59 |
| 4,033,889 | 7/1977 | Kiovsky | 252/56 |
| 4,089,794 | 5/1978 | Engel et al. | 252/51.5 A |
| 4,120,803 | 10/1978 | Malec | 252/51.5 A |
| 4,160,739 | 7/1979 | Stambaugh et al. | 252/34 |
| 4,161,452 | 7/1979 | Stambaugh et al. | 252/34 |

FOREIGN PATENT DOCUMENTS 2746549  4/1978  Fed. Rep. of Germany.
1436981  5/1976  United Kingdom.

Primary Examiner—Arthur P. Demers
Attorney, Agent, or Firm—William H. Pittman; Ronald L. Lyons; John P. Ward

[57] ABSTRACT

Reaction products prepared by reacting
(a) interpolymers of ethylene, one or more $C_3$–$C_8$ α-monoolefins, and one or more polyenes selected from non-conjugated dienes and trienes, with
(b) one or more olefinic carboxylic acid acylating agents to form an acylating reaction intermediate which is further reacted with
(c) an amine, are disclosed. These reaction products have been found useful as multi-functional additives to a variety of lubricating oils for enhancing their dispersancy as well as improving their viscosity-temperature relationship.

52 Claims, No Drawings

MULTI-PURPOSE ADDITIVE COMPOSITIONS AND CONCENTRATES CONTAINING SAME

BACKGROUND OF THE INVENTION

1. Field of the Invention

The present invention relates to novel additive compositions for use in lubricating oils. More particularly, the invention is directed to multi-purpose additives, lubricants and concentrates containing the same. By multi-purpose additive is meant an additive which provides a lubricant with at least two functional properties such as dispersancy and improvement in viscosity index.

2. Description of the Prior Art

Prior art additives functioning as viscosity index (VI) improvers and dispersants have comprised a variety of nitrogen-containing or oxygen-containing polymeric substances and adducts. Generally, the functionality believed responsible for VI improvement is derived from the polymeric nature of the additive as exemplified by its molecular weight (usually high) and morphology (usually amorphous). Collaterally, dispersancy/detergency aspects have been attributed to the additive's nitrogen and sometimes oxygen-containing moieties. Accordingly, it has been a typical approach to interreact a known viscosity index improver with a known detergent/dispersant. Often, the resulting product either lacked in both functionalities or had one inferior functionality. The reason for this is that it is difficult to prepare such additives without sacrificing some important inherent aspects. Typical prior art additives include reaction products of ethyene-propylene copolymer with maleic anhydride and polyamine, ethylene-propylene-non-conjugated diene terpolymer with maleic anhydride and polyamine, and ethylene-propylene-1,4-hexadiene terpolymer with maleic anhydride and polyol. For review of prior art disclosures concerning multi-purpose additives and particularly as related to VI improvers and/or dispersants reference is made to the following prior art U.S. Pat. Nos. whose disclosures are incorporated herein by reference; 2,973,344, 3,488,049, 3,799,877, 3,278,550, 3,513,095, 3,842,010, 3,311,558, 3,563,960, 3,864,098, 3,312,619, 3,598,738, 3,864,268, 3,326,804, 3,615,288, 3,879,304, 3,403,011, 3,637,610, 4,033,889, 3,404,091, 3,652,239, 4,051,048, 3,445,389, 3,687,849. The significance of a multi-purpose additive cannot be overestimated, particularly in terms of the economical advantages gained by employing a single additive in place of two or more additives.

It is therefore a primary object of this invention to provide novel multi-purpose lubricant additives.

A more specific object of the invention is to provide multi-purpose additives directed to improving lubricants' viscosity index and their dispersancy/detergency properties.

A further object is to provide processes for preparing such multi-purpose additives, as well as lubricants and concentrates containing the same.

Other objects and advantages will become more apparent from the following description.

SUMMARY OF THE INVENTION

I have found that the foregoing objects can be realized by at least one additive composition comprising the reaction product prepared by the process which comprises the steps of:

(A) reacting one or more interpolymers, prepared from ethylene, at least one $C_3$–$C_8$ α-monoolefin, and at least one polyene selected from non-conjugated dienes and trienes with at least one olefinic unsaturated carboxylic acid acylating agent at a temperature below that at which any substantial thermal degradation of any of said interpolymers takes place to form thereby one or more reaction intermediates characterized by the presence of carboxylic acid acylating functions within their structure, said interpolymers having a minimum inherent viscosity of about 0.3 as measured on a 0.1 wt. percent solution in carbon tetrachloride at 30° C., and comprising about 30 to about 85 mole percent ethylene, about 15 to about 70 mole percent of said at least one $C_3$–$C_8$ α-monoolefin, and from about 0.5 to about 20 mole percent of said at least one polyene and (B) reacting the one or more reaction intermediates formed in (A) with an amine reactant selected from the group consisting of monoamines, polyamines, and mixtures of two or more of such monoamines and polyamines, the amount of said amine reactant being sufficient to substantially react with about 50 to 100% of the carboxyl acylating functions of said intermediates, said amine reactant being further characterized by (a) the substantial absence of any one amine having more than one functional group capable of being acylated readily with the said carboxyl acylating functions of said intermediates and (b) the presence within the structure of any one amine of either one primary amino group or one secondary amino group, but not both.

DETAILED DESCRIPTION OF THE INVENTION

In a broad aspect of the invention, the additive composition is prepared from at least two components (a) the acylating interpolymer reaction intermediate, and (b) the amine reactant.

THE ACYLATING INTERPOLYMER REACTION INTERMEDIATE

The term, interpolymer, as used in the present invention, denotes a polymeric product formed principally from ethylene and at least two other different and distinct monomers. Specifically, the other monomers are selected from one or more α-monoolefins having 3 to 8 carbon atoms, and one or more polyene selected from non-conjugated dienes and trienes. The preparation of the interpolymer can be carried out in accordance with known methods and conventional procedures known to the art. Typically, a mixture of ethylene, α-monoolefin, such as propylene, and a polyene such as 1,4-hexadiene is prepared in a suitable solvent such as tetrachloroethylene and the contents allowed to polymerize under atmospheric pressure in the presence of a Ziegler-Natta catalyst to produce the desirable interpolymer (in this case the formed interpolymer is a terpolymer of ethylene, propylene and 1,4-hexadiene). Other preparative methods may involve the polymerization of ethylene, propylene and the diene or triene in the presence of hydrogen and a polymerization catalyst.

The proportions of the various monomers can vary considerably depending on the ultimate use of the resulting interpolymer. Usually, the interpolymer comprises 10 to 90 mole percent ethylene, 5 to 70 mole percent of the α-monoolefin, and 0.1 to 20 mole percent of the polyene. Preferably, the interpolymer is one comprising about 30 to about 85 mole percent ethylene, about 15 to about 70 mole percent α-monoolefin, and about 0.5 to about 20 mole percent polyene. Moreover, the interpolymer should be such that its inherent viscosity as measured in 0.1% solution in carbon tetrachloride at 30° C. is between about 0.3 to 5. Inherent viscosity is expressed as ln Nr/C, wherein Nr is the viscosity of the solution relative to the viscosity of the solvent, and C is the concentration expressed in grams of solution per 100 mls. of solvent.

Inherent viscosity is often used as means to determine the molecular weight of polymers. For the purpose of the present invention the interpolymer should be expressed by the value of its inherent viscosity rather than molecular weight. The latter is often difficult to determine accurately. However, as a general approximation the interpolymer of the present invention has an average weight molecular weight $\overline{M}w$ in the range of about 30,000 to about 1,000,000 or more. Also, the ratio of $\overline{M}w/\overline{M}n$ is normally about 1 to as high as about 8.

For best results the interpolymer should be prepared in amorphous form. Preparation of essentially amorphous polymers is known in the art. A typical procedure is the one described in U.S. Pat. No. 3,300,459 and in Journal of Polymer Science, 51, 411 ff and 429 ff (1961). Similarly, control of molecular weight and/or molecular weight distribution can be effected by known methods such as those disclosed in Journal of Polymer Science, 34, 531 ff (1959). For example, a chain transfer agent such as zinc alkyl can be employed. The foregoing patent and two journal articles are expressly incorporated herein by reference for their teachings as summarized above.

As indicated earlier, ethylene is an essential monomer in preparing the interpolymer. As to the α-monoolefin monomer, it should not have more than about 8 carbon atoms in the chain. Preferably, the monoolefin is selected from propylene, 1-butene, 1-pentene or 1-hexene. The most preferable monoolefin is propylene for reasons of efficiency and economy. Of course, more than one α-monoolefin can be utilized in preparing the interpolymer of the invention.

The third component in the interpolymer is a polyene monomer selected from non-conjugated dienes and trienes. The non-conjugated diene component is one having 5 to 14 carbon atoms in the chain. Preferably, the diene monomer is characterized by the presence of a maximum of one vinyl group $CH=CH_2$ in its structure and can include for the purpose of the invention cyclic and bi-cyclo compounds such as 1,4-hexadiene, 1,4-cyclohexadiene, dicyclopentadiene, 5-ethylidene-2-norbornene, 5-methylene-2-norbornene, 1,5-heptadiene, and 1,6-octadiene, all of which are commercially available. A mixture of more than one diene can be used in the preparation of the interpolymer, if desired. The most preferred non-conjugated diene is 1,4-hexadiene.

The triene component can have at least two conjugated double bonds, and up to about 30 carbon atoms in the chain. Typical trienes useful in preparing the interpolymer of the invention are 1-isopropylidene-3a,4,7,7a-tetrahydroindene, 1-isopropylidenedicyclopentadiene, dehydro-iso-dicyclopentadiene, and 2-(2-methylene-4-methyl-3-pentenyl)-[2.2.1] bicyclo-5-heptene. Some of the foregoing trienes are commercially available and have been used in making terpolymers known as EPTM for ethylene, propylene, triene monomer. If desired, more than one triene can be used to make the interpolymer of the present invention. For efficiency and economy, the diene component is preferred to the triene component.

The interpolymer prepared by the polymerization of ethylene, at least one monoolefin, and at least one polyene should be stably dispersible, and preferably soluble, in mineral oil which can serve as the medium in which the interpolymer is reacted with the unsaturated carboxylic acid acylating agent. It is not necessary that the reaction with the unsaturated acylating agent is conducted in mineral oil medium because other media such as natural, animal and vegetable oils as well as various synthetic lubricating oils are also quite suitable. Generally, mineral oil (neutral oil SUS 100) is the medium of choice for conducting this type of addition reaction. The oil solution (or a stable dispersion) of the interpolymer is prepared first. Depending on the molecular weight of the interpolymer an oil solution comprising about 0.1 to about 15% by weight of the interpolymer is prepared. The unsaturated acylating agent is added to the oil solution and the mixture is heated with reflux and under inert atmosphere up to about 250° C. or even higher. Care must be taken so that the interpolymer does not experience any degradation or cracking to fractions of lower molecular weight. The addition reaction is considered complete when the refluxing of the acylating agent is reduced noticeably. The reaction will generally be completed in a period of time ranging from about an hour to as high as about 40 hours. Shorter or longer reaction times are possible. The acylating interpolymer reaction intermediate formed is generally soluble in the oil medium. Unreacted materials can be removed by vacuum stripping from the oil solution, or by blowing with inert gas such as nitrogen.

The carboxylic acid acylating agent must have at least one point of olefinic unsaturation (i.e.,

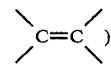

in its structure. Usually, the point of olefinic unsaturation will correspond to $—HC=CH—$ or $CH=CH_2$. Acylating agents where the point of olefinic unsaturation is α,β to a carboxy function are very useful. Olefinically unsaturated mono-, di-, and polycarboxylic acids, the lower alkyl esters thereof, the halides thereof, and the anhydrides thereof represent typical acylating agents in accordance with the present invention. Preferably, the olefinically unsaturated carboxylic acid acylating agent is a mono- or dibasic acid, or a derivative thereof such as anhydrides, lower alkyl esters, halides and mixtures of two or more such derivatives. By "lower alkyl" is meant alkyl groups of one to seven carbon atoms. Preferred acylating agents are acrylic acid, methacrylic acid, maleic acid, fumaric acid, crotonic acid, citraconic acid, itaconic acid, mesaconic acid, their anhydrides and mixtures of two or more of said acids and/or anhydrides. The most preferred acylating agents are maleic acid and its anhydride.

THE AMINE REACTANT

The amine reactant is one selected from the group consisting of monoamines, polyamines or mixtures thereof. Said amine reactant is characterized by (a) having substantially no more than one functional group capable of being acylated readily with the carboxylic acylating functions of said reaction intermediate; and (b) the presence within its structure of any one amine of either one primary amino group or one secondary amino group, but not both. Graphically, the amine reactant can be represented by the formula RNR'H in which R' is hydrogen or R, and R is a hydrocarbon-based radical. R and R', taken together with the amino nitrogen to which they are attached, can form a 5-, 6- or even 7-membered heterocyclic ring having no more than three hetero atoms such as oxygen, sulfur, and nitrogen. When the heterocyclic ring comprises nitrogen, it should satisfy the provision (b) above in that any additional nitrogen atom is not part of a primary or secondary amino group. The amine reactant of the invention includes primary or secondary amines which can be aliphatic-, cycloaliphatic, aryl-, or heterocyclic amines. As a general rule, the amine will contain up to about 22 carbon atoms, usually not more than about 16 carbon atoms, and preferably not more than about 12 carbon atoms.

As used herein, the term "hydrocarbon-based radical" of the amine reactant denotes a radical attached directly to the amine nitrogen through a carbon atom, said radical having predominantly hydrocarbon character within the context of this invention. Such radicals include the following:

(1) Hydrocarbon radicals; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, any two indicated substituents may together form an alicyclic radical). Such radicals are known to those skilled in the art;

(2) Substituted hydrocarbon radicals; that is, radicals containing non-hydrocarbon substituents which, in the context of this invention, do not alter the predominantly hydrocarbon character of the radical. Those skilled in the art will be aware of suitable substituents (e.g., halo-, alkoxyl-, mercapto-, nitro-, sulfoxy-, etc.).

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, pyridyl, furanyl, thiophenyl, imidazolyl, morpholino-, etc.

In general, no more than about three substituents or hetero atoms, and preferably no more than one, will be present for each 10 carbon atoms in the hydrocarbon-based radical.

Terms such as "aliphatic-based radical","alkyl-based radical" and "aryl-based radical" and the like have analogous meanings to hydrocarbon-based with respect to aliphatic, alkyl and aryl radicals.

Preferably, the hydrocarbon-based radicals in the amine reactant of this invention are free from acetylenic unsaturation, (i.e., —C≡C—) ethylenic unsaturation (i.e.,

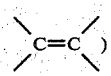

can be present so long as it does not interfere significantly with the reaction of the carboxylic acid acylating functions with the functional group of the amine reactant. Usually, no more than one point of ethylenic unsaturation is present per 5 carbon atoms and preferably none.

Typical amine compounds suitable for use in the invention are ammonia, alkylamines such as methylamine, ethylamine, propylamine, N-methylethylamine, N-dimethylpropylamine, N-methyloctylamine, N-cyclohexyl-aniline, dibutylamine, cyclohexylamine, aniline, di(p-methyl-phenyl)-amine, dodecylamine, octadecylamine, cyclohexamine, pyrrolidine, heterocyclic amines such as isomeric amino pyridines, isomeric naphthyl amines, phenothiazine, N-aminoalkylmorpholine and alkyl oxazolidine. Preferred amines are the primary and secondary alkyl amines, and heterocyclic amines, especially N-aminoalkylmorpholine.

The reaction between the acylating interpolymer reaction intermediate and the amine reactant is generally conducted in a suitable medium such as the mineral oil in which the interpolymer is prepared. Generally, the amine reactant is added in small increments over a period of time spanning from about one to several hours, depending on the reaction temperature. Of course, at ambient temperatures the reaction will take a much longer time than at higher temperatures. The range of 20° to about 280° C. has been found operable with preference to the range of about 100° to about 280° C. More preferred temperature range is from about 115° to about 250° C., and most preferred is from about 150° to about 220° C.

As indicated earlier, the addition of the amine reactant preferably is made in small increments to avoid unnecessary losses. The entire amine reactant can be added if the reaction temperature is not high, however.

The completion of the reaction can be monitored by procedures known to the art. Conveniently, infrared is used to determine the extent of reaction by following changes in the bands of the acylating group. If the acylating agent reacted with the interpolymer is an anhydride, for example, then the reaction with the amine can be monitored by the disappearance of the anhydride band from the infrared spectrum. Another method is to check periodically the acid number of the reaction medium until the desired acid number is obtained.

The reaction between the acylating functions of the interpolymer reaction intermediate and the amine reactant should be carried out until at least about 50% of the available acylating functions have reacted. Preferably, the reaction is carried to completion until substantially all acylating functions are no longer detectable by conventional means such as IR spectrum. Excess amine reactant may be removed by conventional techniques such as by stripping procedures. In practice, the reaction is usually conducted under nitrogen which can be used to blow off the remaining amine reactant after the reaction is deemed complete. The reason for conducting the reaction under nitrogen, or any other inert gas, is to minimize exposure to oxygen which tends to form unstable products.

The additive composition of the present invention can be incorporated in various lubricating oil compositions in concentrations within the range of about 0.001 to about 5% by weight (based on the total weight of the lubricating oil composition including the additive composition), preferably from about 0.05 to about 3% by weight, and most preferably from about 0.1 to about 2% by weight. Concentrates comprising a minor proportion of said additive composition, e.g., from about 2 to about 40% by weight, in a major proportion of inert or substantially inert, normally liquid organic diluent or solvent such as lubricating oil, kerosene, xylene, etc., can be prepared and form part of this invention. Of course, other additives can be present with said additive composition in the lubricant compositions and concentrates.

From the above, it can be seen that the additive compositions of the present invention should be oil-soluble or stably dispersible in oil as such terms are defined below:

Oil Soluble

The additive compositions of this invention are soluble and/or stably dispersible in the normally liquid media, e.g., the lubricating oils in which they are intended to function. Thus, for example, compositions intended for use in oils are oil-soluble and/or stably dispersible in an oil in which they are to be used. The term "oil-soluble" as used in this specification and appended claims does not necessarily mean that all the compositions in question are miscible or soluble in all proportions in all oils. Rather, it is intended to mean that the composition is soluble in an oil (mineral, synthetic, etc.) in which it is intended to function to an extent which permits the solution to exhibit one or more of the desired properties. Similarly, it is not necessary that such "solutions" be true solutions in the strict physical or chemical sense. They may instead be micro-emulsions or colloidal dispersions which, for the purpose of this invention, exhibit properties sufficiently close to those of true solutions to be, for practical purposes, interchangeable with them within the context of this invention.

Stably Dispersible

The term "stably dispersible in the normally liquid media" as used in this specification and appended claims is intended to mean a composition (e.g., a single additive or compound, a mixture of two or more additives or compounds, etc.) is capable of being dispersed in a given medium to an extent which allows it to function in its intended manner. Thus, for example, where a composition of this invention is used in an oil, it is sufficient that the composition be capable of being suspended in the oil in an amount sufficient to enable the oil to possess one or more of the desired properties imparted to it by the suspended composition. Such suspension of the compositions can be achieved in various conventional ways. For example, in constantly circulating oil or oil in splash lubricating systems, physical agitation can keep the compositions suspended in oil. Likewise, conventional dispersants (such as the acylated nitrogen dispersants disclosed in U.S. Pat. No. 3,219,666) often found in lubricating oils and fuels promote the stable dispersion or suspension of the composition. In any event, the intended compositions will be "soluble" or "stably dispersible" in the normally liquid media in which they will be used in at least the minimum concentrations set forth elsewhere herein. Thus, the terminology "soluble" and "stably dispersible" is used in a conventional manner and will be understood to those of ordinary skill in the art.

Substantially Inert

As used in the specification and the appended claims, the term "substantially inert" when used to refer to solvents, diluents, and the like, is intended to mean that the solvent, diluent, etc., is sufficiently inert to chemical or physical change under the conditions in which it is used so as not to materially interfere in an adverse manner with the preparation, storage, blending and/or functioning of the compositions, additive, compound, etc. of this invention in the context of its intended use. For example, small amounts of a solvent, diluent, etc. can undergo minimal reaction or degradation without preventing the making and using of the invention as described herein. In other words, such reaction or degradation, while technically discernible, would not be sufficient to deter the practical worker of ordinary skill in the art from making and using the invention for its intended purposes. "Substantially inert" as used herein is, thus, readily understood and appreciated by those or ordinary skill in the art.

Unrefined, refined and rerefined oils (and mixtures of each with each other) of the type disclosed hereinabove can be used in the lubricant compositions of the present invention. Unrefined oils are those obtained directly from a natural source without further purification treatment as well as the growing class of synthetic oils. For example, a shale oil obtained directly from retorting operations, a petroleum oil obtained directly from distillation or a synthetic ester oil obtained directly from an esterification process and used without further treatment would be unrefined oils. Refined oils are similar to the unrefined oils except they have been further treated in one or more purification steps to improve one or more properties. Many such purification techniques are known to those of skill in the art such as solvent extraction, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

The additive compositions of the present invention are useful as multi-purpose additives in a variety of lubricating oils for improving their viscosity index and dispersancy/detergency properties.

For the purpose of clarity the viscosity-temperature relationship of an oil as described herein refers to the rate of change of viscosity of said oil with temperature. When the temperature range is 100° to 210° F., viscosity-temperature relationship becomes identical to the known term "viscosity index". Additives which retard the tendency of the oil to thin as the temperature is raised from 100° to 210° F. are referred to as viscosity index improvers (VI improvers).

The lubricating power of a lubricant is related, in part, to its viscosity. Thus, any appreciable change in viscosity will affect the performance of the lubricant. Normally, the changes mostly are noticed when the lubricant becomes less viscous (thin) as the temperature rises, or more viscous (thick) as the temperature decreases. While some minor changes can be tolerated, it is essential for today's lubricants to have minimal but controlled changes in viscosity. To best improve the viscosity temperature relationship of a particular lubricant the additive composition should be prepared from a high molecular weight interpolymer. Preferably, the starting interpolymer should have a molecular weight of greater than about 40,000 (inherent viscosity of about 1.0 or larger). Interpolymers having a molecular weight ($\overline{M}w$) of about 100,000 or greater are very useful as viscosity improvers. However, by comparison, prior art additives prepared from high molecular weight polymers (including terpolymers and interpolymers) for use as VI improvers are known to develop shear stability problems when the lubricant into which they are incorporated is put to use. To avoid these shear stability problems (mainly developed by break-up of large molecules when subjected to high shear) it has been necessary to subject these polymers to thermal cracking or degradation, including mechanical degradation, to produce polymeric fractions of substantially lower molecular weights (about 5,000 to 10,000 $\overline{M}w$). Such fractions tend to have better shear stability than their precursors. In preparing the additive compositions of the present invention the interpolymers need not be broken up to smaller fractions by thermal or mechanical degradation. In fact, it is preferred not to subject such interpolymers to any cracking or degradation procedure.

The multi-functional capability of the additive compositions of the present invention is shown clearly by the ability to formulate with such additives several types of multigrade oils. For example, oils of 5W50, 10W50, 10W40 and 10W30 have been formulated successfully utilizing one or more additives of the invention. In preparing such formulations commercially available base oils (100 neutral) were used. If other VI improvers and dispersants are utilized, then such others are used in supplemental role whereby the total amounts do not exceed recommended proportions.

As indicated earlier, lubricant compositions and/or concentrates containing the additives of the present invention can contain other known and conventional additives such as pour point depressant, antiwear agents, other viscosity index improvers, ashless dispersants and ash-containing detergents such as overbased sulfonates, and antioxidants.

The ash-producing detergents are exemplified by oil-soluble neutral and basic salts of alkali or alkaline earth metals with sulfonic acids, carboxylic acids or organic phosphorous acids characterized by at least one direct carbon-to-phosphorous linkage such as those prepared by the treatment of an olefin polymer (e.g., polyisobutene having a molecular weight of 1000) with a phosphorizing agent such as phosphorous trichloride, phosphorous heptasulfide, phosphorous pentasulfide, phosphorous trichloride and sulfur, white phosphorous and a sulfur halide, or phosphorothioate chloride. The most commonly used salts of such acids are those of sodium, potassium, lithium, calcium, magnesium, strontium and barium.

The term "basic salt" is used to designate the metal salts wherein the metal is present in stoichiometrically larger amounts than the organic acid radicals. The commonly employed methods for preparing the basic salts involves heating a mineral oil solution of an acid with a stoichiometric excess of a metal neutralizing agent such as a metal oxide, hydroxide, carbonate, bicarbonate, or sulfide at a temperature above about 50° C. and filtering the resulting mass. The use of a "promoter" in the neutralization step to aid in the incorporation of a large excess of metal likewise is known. Examples of compounds useful as the promoter include phenolic substances such as phenol, naphthol, alkylphenols, thiophenols, sulfurized alkylphenols, condensation products or formaldehyde with such phenolic substances, alcohols such as methanol, 2-propanol, octyl alcohol, Cellosolve, Carbitol, ethylene glycol, cyclohexyl alcohol; amines such as aniline, phenylene diamine, phenothiazine; phenyl-beta-naphthylamine, and dodecylamine. A particularly effective method for preparing the basic salts comprises mixing an acid with an excess of a basic alkaline earth metal neutralizing agent, a phenolic promoter compound, and a small amount of water, and carbonating the mixture at an elevated temperature such as 60° to 200° C.

Extreme pressure agents and corrosion-inhibiting and oxidation-inhibiting agents are exemplified by chlorinated aliphatic hydrocarbons such as chlorinated wax; organic sulfides and polysulfides such as benzyldisulfide, bis-(chlorobenzyl)-disulfide, dibutyl tetrasulfide, sulfurized sperm oil, sulfurized methyl ester of oleic acid, sulfurized alkylphenol, sulfurized dipentene, and sulfurized terpene; phosphosulfurized hydrocarbons such as the reaction product of phosphorus sulfide with turpentine or methyloleate; phosphorous esters including principally dihydrocarbon and trihydrocarbon phosphites such as dibutylphosphite, diheptyl phosphite, dicyclohexyl phosphite, pentylphenyl phosphite, dipentyl phenyl phosphite, tridecyl phosphite, distearyl phosphite, dimethyl naphthyl phosphite, oleyl 4-pentyl phenyl phosphite, polypropylene-(molecular weight 500)-substituted phenyl phosphite, diisobutyl-substituted phenyl phosphite; metal thiocarbamates such as zinc dioctyldithiocarbamate and barium heptylphenyl dithiocarbamate; Group II metal phosphorodithioates such as zinc dicyclohexyl phosphorodithioate, zinc dioctyl phosphorodithioate, barium (di(heptylphenyl))-phosphorodithioate, cadmium dinonyl phosphorodithioate, and a zinc salt of a phosphorodithioic acid produced by the reaction of phosphorus pentasulfide with an equal molar mixture of isopropyl alcohol and n-hexyl alcohol.

The following examples are presented for the purpose of illustration and should not be construed as limiting the invention. All parts and percentages in the following examples and elsewhere in the present specification and claims express parts and percentages by weight unless clearly stated otherwise. All temperatures are in centigrade unless specified otherwise.

EXAMPLE A

To 5670 parts of a stock oil solution (a solvent refined neutral oil having a viscosity of 100 SUS at 210° F. and minimum VI of 95, marketed by the Cities Service Oil Company, New York, New York) containing 10 percent by weight of Ortholeum 2052 (a product marketed by the duPont Company, Wilmington, Delaware, which is a terpolymer having about 48 mole percent ethylene groups, 48 mole percent propylene groups and 4 mole percent 1,4-hexadiene groups, and having inherent viscosity of 1.35 as measured in a blend of 8.2 grams of polymer in 100 cc of $CCl_4$ at 30° C.) is added 98 parts of maleic anhydride, and the oil mixture is heated to 210°–220° C. Kept under a positive $N_2$ pressure the mixture is maintained at the temperature range of 210°–220° C. for 15 hours, at which time the maleic anhydride refluxing begin to diminish. Excess maleic anhydride is removed by blowing with $N_2$. The residual succinated reaction product is filtered through Dicalite yielding as a filtrate 5690 parts of an oil solution of the desired acylating interpolymer reaction intermediate.

EXAMPLE B 5670 parts of the reaction intermediate from Example A is heated to 180° C., then N-(3-aminopropyl)morpholine is added in 9 three-part increments (27 parts total) at 0.5 hour intervals. The reaction between the reaction intermediate and aminopropyl morpholine is considered complete when the infrared spectrum showed the substantial absence of anhydride peaks. The acylated aminopropyl morpholine reaction product then is filtered through Dicalite 400 yielding as a filtrate 5210 parts of a brown liquid, containing 0.086% N. The filtrate is an oil solution of an additive composition of this invention.

EXAMPLE C

A mixture of 600 parts Ortholeum 2052 (described in Example A), 5400 parts of 100 neutral oil (as in Example A) and 147 parts maleic anhydride is reacted at 210°–215° C. for 15 hours under a positive $N_2$ pressure. Unreacted maleic anhydride is removed by $N_2$ blowing. The residue is filtered with Dicalite 1600 yielding as a filtrate 5510 parts of oil solution of the desired acylating interpolymer reaction intermediate.

EXAMPLE D

To 500 parts of the reaction intermediate described in Example C heated to 170° C. under a slight $N_2$ pressure is added 3.5 parts of N(3-aminopropyl) morpholine in 5 small increments. The reaction is monitored by infrared to indicate the extent of its completion by observing absence of anhydride peak. The anhydride-free material is filtered through Dicalite 1600 yielding 465 parts of an oil solution comprising an additive according to the invention. The final oil solution analyzes to 0.135% by weight nitrogen.

EXAMPLE E 500 parts of the intermediate described in Example C are heated to 160° C. under a slight $N_2$ pressure. Then 1 ml. of a 0.25 part/ml solution of 3-methoxypropyl amine in tetrahydrofuran is added. Five additional increments of 1 ml. each are added. The reaction is monitored by infrared to indicate its completeness by substantial absence of anhydride peak. The anhydride free reaction product is filtered through a bed of Dicalite 1600 yielding as a filtrate 490 parts of final oil solution comprising an additive of this invention and containing 0.060% N.

EXAMPLE F 6000 parts of a stock oil solution containing 10 percent by weight (600 parts) of Ortholeum 2052 (described in Example A) is heated to 110° C. then chlorinated by bubbling 60 parts $Cl_2$ into the solution over a 4 hour period, followed by $N_2$ blowing for an additional hour to remove any unreacted $Cl_2$ or HCl. 6020 parts of a product containing 0.37% Cl is obtained.

The chlorinated material is heated in a vessel to 210° C. after which 98 parts of maleic anhydride is added. The mixture is reacted at 210° C. for 16 hours, then blown with nitrogen to remove any unreacted maleic anhydride. 6030 parts of acylating interpolymer reaction intermediate containing 0.18% Cl is obtained.

6000 parts of the above intermediate is heated at 160°–170° C. under a slight $N_2$ pressure. 30 parts of N-(3-aminopropyl)morpholine is added in five equal increments. The reaction is followed by infrared to determine the extent of the anhydride reaction. The final reaction product is filtered through Dicalite 1600 to give as a filtrate 5730 parts of oil solution comprising an additive of this invention.

EXAMPLE G

Gaseous $NH_3$ is added at 130° C. to 500 parts of an acylating interpolymer reaction intermediate prepared in accordance with the procedure described in Example C. Upon initial addition of $NH_3$, the viscosity of the oil is observed to increase measurably. The temperature is raised to 170° C. to lower the viscosity to normal level. A total of 29 parts of $NH_3$ is added. Most of the $NH_3$ does not react due to short contact time with the reaction mixture. Stirring of the reaction mixture is continued for 3 hours at 170° C. after which it is filtered through Dicalite 1600 to yield 478 parts of oil solution comprising an additive of this invention.

EXAMPLE H 7500 parts of a stock oil solution (100 neutral oil) containing 10 percent by weight of Ortholeum 2052 (described in Example A) and 7.5 parts butylated hydroxytoluene are heated to 160° C. under a positive $N_2$ pressure. 123 parts of maleic anhydride is added and the temperature is gradually raised to 210°–220° C. over 16 hours. The formed acylating reaction intermediate is blown with $N_2$ to remove excess maleic anhydride.

The intermediate material is held at 170°–180° C. and 27 parts of N-(3-aminopropyl)morpholine are added in small increments. The reaction is followed by infrared to determine extent of reaction by the disappearance of anhydride band. The reaction mixture is filtered through Dicalite 1600 yielding as a filtrate 7520 parts of an oil solution comprising an additive of the invention and containing 0.065% N.

EXAMPLE I

A mixture of 600 parts Ortholeum 2052 (described in Example A), 5400 parts 100 neutral oil, (as in Example A) 6 parts butylated hydroxytoluene and 33 parts maleic anhydride is reacted at 210° C. for 14 hours followed by an additional 8 hours at 245° C. under $N_2$. Excess maleic anhydride is removed by blowing with $N_2$ for 3 hours. The infrared spectrum of the residue showed presence of anhydride.

A total of 24 parts of N-(3-aminopropyl)morpholine is added to small increments with 0.5 hours between each increment. The reaction is followed by infrared to indicaate the substantial absence of the anhydride after the final addition. The reaction mixture is filtered through Dicalite 400 to yield as a filtrate 5590 parts of oil solution comprising an additive of the invention and containing 0.064% N.

EXAMPLE J 500 parts of the intermediate described in Example C are heated under a $N_2$ pressure to 160°–170° C. followed by the addition over a 2-hour period of two 1-part increments of a 50% toluene solution of a commercial ethylene polyamine mixture having an average of 3 to 10 nitrogen atoms per molecule and containing about 35% nitrogen. Upon addition of the second increment the materials gel.

EXAMPLE K 500 parts of the intermediate described in Example C are heated under $N_2$ to 170° C. One part of piperazine is added whereupon the materials immediately gel.

EXAMPLE L 500 parts of the intermediate described in Example C are heated under $N_2$ to 170° C. 2 ml of a 50 percent by weight solution of N-(3-aminopropyl)diethanolamine in toluene is added. The materials gel soon after the addition of the polyfunctional amine.

EXAMPLE M 500 parts of the intermediate described in Example C are heated to 80° C. under a slight N₂ pressure. 0.1 part hydrazine as 2 ml of a 0.05 part in tetrahydrofuran solution is added resulting in immediate gelling. The gelled material is heated to 170° C. without any significant change in its viscosity.

EXAMPLE N 500 parts of the intermediate described in Example C are heated under a slight positive N₂ pressure to 85°–95° C. 0.058 part NH₃ is added incrementally as a solution of NH₄OH in tetrahydrofuran. The reaction is followed by infrared observing the disappearance of anhydride. This is followed by the addition of three 0.029 part portions of NH₄OH to complete the reaction. The temperature is raised to 180° C. and blown with N₂ to remove H₂O. An oil solution comprising an additive according to the invention is obtained, containing 0.059 percent nitrogen.

EXAMPLE O

A mixture of 600 parts Ortholeum 2052 (described in Example A), 5400 parts of 100 neutral oil, (as in Example A) 6 parts of butylated hydroxytoluene and 17 parts of maleic anhydride is reacted at 210° C. for 10 hours under N₂. 81 parts additional maleic anhydride is added and the mixture is reacted for 12 hours at 210°–215° C. The resulting mixture is blown with nitrogen at 180° C. for 2 hours to remove unreacted maleic anhydride.

To the oil mixture comprising the acylating reaction intermediate is added 36 parts of N-(3-aminopropyl)morpholine in 6 equal increments at 170°–180° C. After substantial elimination of the anhydride, the oil mixture is filtered through Dicalite 400 yielding 5310 parts of an oil solution comprising an additive in accordance with the present invention.

EXAMPLE P

To 7500 parts of a stock oil solution (10 percent by weight Ortholeum 2052 in a solvent (extracted neutral oil having a viscosity of 90–100 SUS at 210° F. and a minimum VI of 93, marketed by the Standard Oil Company, Cleveland, Ohio) is added 7.5 parts butylated hydroxy toluene and 123 parts of maleic anhydride. These are reacted at 210°–220° C. for 16 hours under a slight positive N₂ pressure. Excess maleic anhydride is removed by nitrogen blowing at 180° C. The distillate comprising the intermediate is collected, and by acid number titration it is determined that 65 parts maleic anhydride is collected.

The acylating reaction intermediate in oil is cooled to 160°–170° C. N-(3-aminopropyl)morpholine is added in 6-part increments until the infrared spectrum shows all anhydride is consumed. A total of 48 parts N-(3-aminopropyl)morpholine is required to complete the reaction. The resulting oil mixture is filtered through Dicalite 1600 yielding 6990 parts of oil solution of an additive of the invention which contain 0.117% nitrogen.

EXAMPLE Q

A stock oil solution (2365 parts) prepared by dissolving 10% by weight of Ortholeum 2052 in White Oil (a highly refined mineral oil) is chlorinated by bubbling 34 parts Cl₂ into the solution at 110°–125° C. over a period of 4 hours, followed by N₂ blowing for 2 hours at 115° C. to remove any Cl₂ or HCl. 2380 parts of a product containing 0.67% Cl is obtained.

To 2230 parts of the above chlorinated product is added 40 parts of maleic anhydride. The mixture is heated and stirred at 160°–210° C. for 8 hours followed by N₂ blowing to remove any unreacted maleic anhydride. The acylating interpolymer reaction intermediate obtained weighs 2240 parts and contains 0.41% Cl.

1930 parts of the acylating intermediate is heated to 160° C. and 2 parts of N-(3-aminopropyl)morpholine is added under N₂. After stirring one hour at 170° C., infrared analysis shows a diminished anhydride peak and a new amide peak. Two additional 1-part increments of N-(3-aminopropyl) morpholine are added followed by heating for one hour at 170° C. after each increment. Additional reduction in anhydride absorption and increased intensity of amide peak in the infrared are observed. Finally, 0.5 part N-(3-aminopropyl)morpholine is added for a total of 4.5 parts. After heating one more hour at 170° C. only a trace of anhydride remains in the infrared. The mixture is filtered through Dicalite 400 yielding as a filtrate 1790 parts of an oil solution comprising an additive of the invention and containing 0.039% N and 0.19% Cl.

EXAMPLE R 1000 parts of the stock solution of Example Q. and 15 parts of maleic anhydride are reacted at 160° C. for 2 hours under N₂. The temperature is then raised gradually to 240° C. over 24 hours. Excess maleic anhydride is removed by blowing the mixture with nitrogen. The residual acylating reaction intermediate in oil weighs 1001 parts. The saponification number is measured as 4.5 and the infrared spectrum shows anhydride peaks at 1875 and 1800 cm$^{-1}$. To 773 parts of the oil solution of the reaction intermediate (at 160° C.) is added 2 parts of N-(3-aminopropyl)morpholine and the mixture is heated to 170° C. for 6 hours at which time the infrared spectrum shows substantially no more anhydride peaks. After filtration through Dicalite 400, 670 parts of an oil solution comprising an additive of the invention is obtained, and which also contains 0.035 percent nitrogen.

EXAMPLE S

A stock oil solution (7500 parts) of Ortholeum 2052 as described in Example P is heated to 140°–160° C. to make a clear oil solution followed by addition of 123 parts maleic anhydride. The mixture is heated at 210°–220° C. for 16 hours under a slight positive nitrogen pressure. The mixture is blown with nitrogen at 120°–190° C. to remove excess maleic anhydride. By titration it is determined that 52 parts of maleic anhydride are removed. To this oil solution of the acylating reaction intermediate is added 36 grams N-(3-aminopropyl)morpholine in 6 equal increments at 160°–170° C. The reaction is followed by observing the reduction of anhydride peaks in the infrared. The resulting oil mixture is filtered through Dicalite 1600 to yield as a filtrate 7030 parts of an oil solution of an additive of the invention which contain 0.085% nitrogen.

EXAMPLE T

A mixture of 700 parts Ortholeum 2052, 6300 parts of 100 neutral oil (a blend of naphthenic and paraffinic oils supplied by Standard Oil Co., Cleveland, Ohio) and 14 parts butylated hydroxy toluene is heated for 16 hours under nitrogen at 120° C. to prepare a stock oil solution.

To this solution 57.2 parts of maleic anhydride is added and the mixture is reacted at 240°–250° C. for 15 hours under nitrogen. Excess maleic anhydride is removed by blowing with nitrogen at 230° C. The oil solution is cooled to 180° C. and 54 parts N-(3-aminopropyl)morpholine is added in small increments until substantially no anhydride peaks are observed in the infrared. Dicalite 400 (245 parts) and 105 parts of Super Filtrol (an acid treated clay marketed by Filtrol Corp.) are added and the mixture is held for 16 hours at 140° C., then filtered. 6500 parts of an oil solution comprising an additive of this invention containing 0.14% nitrogen is obtained.

EXAMPLE U

To 6390 parts of a stock oil solution (100 neutral oil described in Example P) containing 11.5% by weight of Ortholeum 2052 and 0.15% butylated hydroxy toluene are added 120 parts of maleic anhydride. The mixture is reacted under nitrogen for 15 hours at 230°±3° C. Excess maleic anhydride is removed by nitrogen blowing for 3 hours at 220° C. To this acylating interpolymer reaction intermediate oil solution is added 78 grams N-(3-aminopropyl)-morpholine in 6 equal increments. The reaction is followed by infrared and is considered complete when the spectrum showed the substantial absence of anhydride peaks.

The reaction mixture is filtered through Dicalite 400 yielding as a filtrate 6150 parts of oil solution comprising an additive of the invention which contained 0.218% nitrogen.

EXAMPLE V

An interpolymer is prepared by the interpolymerization of 50 mole percent ethylene, 45 mole percent propylene and 4 mole percent of 5-methylene-2-norbornene. The interpolymer formed by a procedure similar to the one described in U.S. Pat. No. 3,691,078 with the substitution of the norbornene for the 1,4-hexadiene.

The interpolymer is dissolved in 100 neutral oil (Example A) to make 10% by weight stock solution. 7500 parts of the stock solution is then heated to about 150° C. and 100 parts of acrylic acid is added. The mixture is heated to 200°–220° C. for about 10 hours under $N_2$ pressure. The acid adduct (acylating interpolymer reaction intermediate) is separated in a manner similar to Example S. The intermediate is then reacted with N-dimethyl propylamine (30 parts) added in small proportions. The product is filtered through Dicalite 1600 to yield 6750 parts of an oil solution comprising an additive of the invention.

EXAMPLE W

Interpolymers of ethylene, propylene, and dienes consisting of 1,5-heptadiene, dicyclopentadiene, 1,4-cyclohexadiene, 5-ethylidene-2-norbornene and 1,6-octadiene are prepared in the following proportions (the procedure is described in Example V).
1. 42% ethylene, 53% propylene, and 5% 1,5-heptadiene.
2. 48% ethylene, 48% propylene, and 4% dicyclopentadiene.
3. 45% ethylene, 45% propylene, and 10% 5-ethylidene-2-norbornene.
4. 48% ethylene, 48% propylene, and 4% 1,6-octadiene.
5. 48% ethylene, 48% propylene, and 4% 1,4-cyclohexadiene.

The above interpolymers are each reacted with the following unsaturated dibasic acids and anhydrides: maleic anhydride, fumaric acid, crotonic acid, citraconic acid and mesaconic acid to form the corresponding acylating interpolymer reaction intermediates, each of which is subsequently reacted with one or more of the following amine: N-(3-aminopropyl)morpholine, methylamine, ethylamine, and N-dimethylpropylamine at a temperature of 200°–220° C. for about 10–16 hours to produce the additives of the invention.

A number of multi-grade automotive oils consisting of 10w50, 10w40, and 10w30 have been formulated utilizing the additive compositions of the present invention. These formulated oils show much improved viscosity-temperature relationship and dispersancy tests show their ability to maintain sludge dispersancy and with little to no deposit formation on internal engine parts.

EXAMPLE X

A lubricating composition suitable for use as a crankcase lubricant is prepared using 10w-40 mineral lubricating oil base obtained from Cit. Con. as additives: 1.0% of antioxidant which is a zinc salt described in U.S. Pat. No. 3,000,822, 0.5% of sulfurized Diels-Alder product as described in RE 27,311, 2.0% of overbased calcium sulfonate, 0.004% of a silicone anti-foam agent, 1.0% of an alkenylated succinic anhydride product with a polyol as described in U.S. Pat. No. 3,381,022, and 9.0% of VI-dispersant additive of Example D.

The above lubricant is used in a Ford Sequence V-C test with the following ratings: Engine sludge 9.5 engine varnish 8.1 which are quite good.

Viscosity measurements at 100°, 40° and −18° C. showed acceptable viscosity measurements.

EXAMPLE Y

Lubricant compositions suitable for use as crankcase lubricants are prepared using 10w-50 mineral base oils having same additives disclosed in Example X but with different proportions. Additives of the invention as prepared in Examples E, F, Q, and R are used in the formulation of these lubricants to provide the same good results shown in Example X.

EXAMPLE Z

A lubricating composition suitable for use as an automatic transmission fluid is prepared using an ATF base oil obtained from Sun Oil, and as additives: 12.6% of the additive of Example F, 2.0% of a dialkylphosphite derived from $C_{14-18}$ alcohols, 0.025% of a red dye, and 0.04% silicone anti-foam agent. The fluid is tested in the conventional manner showing excellent properties.

Additives of the invention have been used also to formulate other lubricants such as marine diesel with notable success.

What is claimed is:

1. An additive composition which comprises a reaction product prepared by the process comprising the steps of:
   (A) reacting, in the absence of free radical initiators, one or more interpolymers, prepared from ethylene, at least one $C_3$–$C_8$ α-monoolefin, and at least one polyene selected from non-conjugated dienes and trienes with at least one olefinic unsaturated carboxylic acid acylating agent at a temperature below that at which any substantial thermal degradation of any of said interpolymers takes place to form thereby one or more acylating reaction intermediates characterized by the presence of carboxylic acid acylating functions within their structure, said interpolymers having a minimum inherent viscosity of about 0.3 as measured in a 0.1 wt. percent solution in carbon tetrachloride at 30° C., and comprising about 30 to about 85 mole percent ethylene, about 15 to about 70 mole percent of said at least one $C_3$–$C_8$ α-monoolefin, and from about 0.5 to about 20 mole percent of said at least one polyene and (B) reacting the one or more reaction intermediates formed in (A) with an N-(aminoalkyl)morpholine in an amount sufficient to substantially react with from about 50 to about 100% of the carboxyl acylating functions of said intermediates.

2. The additive composition of claim 1 wherein said polyene is a triene having at least two non-conjugated double bonds.

3. The additive composition of claim 2 wherein the interpolymer is prepared from $C_3$ to $C_5$ α-monoolefins.

4. The additive composition of claim 3 wherein the interpolymer has an inherent viscosity of about 0.5 to about 5.0.

5. The additive composition of claim 4 wherein the triene is a monomer selected from the group consisting of 1-isopropylidene-3a,4,7,7a-tetrahydroindene, 1-isopropylidenedicyclopentadiene, dehydro-iso-dicyclopentadiene, 2-(2-methylene-4-methyl-3-pentenyl)-[2.2.1]bicyclo-5-heptene, and mixtures of two or more of said triene monomers.

6. The additive composition of claim 5 wherein the olefinic unsaturated carboxylic acid acylating agent is a di- or polycarboxylic acid, the lower alkyl esters thereof, the chlorides and bromides thereof, the anhydrides thereof, and mixtures of two or more of said acylating agents.

7. The additive composition of claim 6 wherein the triene monomer comprises from about 1 to about 10 mole percent of the interpolymer.

8. The additive composition of claim 7 wherein the interpolymer is formed from about 30 to about 70 mole percent ethylene, from about 30 to about 20 percent propylene, and from about 1 to about 5 mole percent triene.

9. The additive composition of claim 8 wherein the acylating agent is an ethylenically unsaturated dicarboxylic acid or an anhydride thereof.

10. An additive composition for lubricants, which comprises a reaction product prepared by the process comprising the steps of:
(A) reacting, in the absence of free radical initiators, one or more interpolymers, prepared from ethylene, at least one $C_3$–$C_8$ α-monoolefin, and at least one $C_5$ to $C_{14}$ non-conjugated diene with at least one olefinic unsaturated carboxylic acid acylating agent at a temperature below that at which any substantial thermal degradation of any of said interpolymers takes place to form thereby one or more reaction intermediates characterized by the presence of carboxylic acid acylating functions within their structure, said interpolymers having a minimum inherent viscosity of about 0.5 as measured in a 0.1 wt. percent solution in carbon tetrachloride at 30° C., and comprising about 30 to about 85 mole percent ethylene, about 15 to about 70 mole percent of said at least one $C_3$–$C_8$ α-monoolefin, and from about 0.5 to about 20 mole percent of said at least one $C_5$ to $C_{14}$ non-conjugated diene, and (B) reacting the one or more reaction intermediates formed in (A) with an N-(aminoalkyl)morpholine in an amount sufficient to substantially react with about 50 to 100% of the carboxyl acylating functions of said intermediates.

11. The additive composition of claim 10 wherein the interpolymer is prepared from a $C_3$ to $C_5$ α-monoolefin.

12. The additive composition of claim 11 wherein said interpolymer has an inherent viscosity of about 0.7 to about 3.0.

13. The additive composition of claim 10 wherein said $C_5$ to $C_{14}$ non-conjugated diene is characterized by the presence of a maximum of one vinyl group —HC=$CH_2$.

14. The additive composition of claim 11 wherein said α-monoolefin is propylene and said non-conjugated diene is selected from the group consisting of 1,4-hexadiene, 5-methylene-2-norbornene, 1,5-heptadiene, dicyclopentadiene, 1,4-cyclohexadiene, 5-ethylidene-2-norbornene, 1,6-octadiene, and mixtures of two or more of said dienes.

15. The additive composition of claim 13 wherein said non-conjugated diene is one or more non-conjugated diolefins of 6 to 8 carbon atoms.

16. The additive composition of claim 14 wherein said olefinic unsaturated carboxylic acid acylating agent is selected from ethylenically unsaturated mono-, di-, or polycarboxylic acids, the lower alkyl esters thereof, the chlorides and bromides thereof, the anhydrides thereof, and mixtures of two or more of said acylating agents.

17. The additive composition of claim 15 wherein the interpolymer is a terpolymer formed from about 30 to about 70 mole percent ethylene, from about 30 to about 70 mole percent propylene, and from about 1 to about 20 mole percent of non-conjugated diolefin.

18. The additive composition of claim 17 wherein the carboxylic acid acylating agent is ethylenically unsaturated in a position α,β to a carboxyl function.

19. The additive composition of claim 18 wherein the non-conjugated diolefin is 1,4-hexadiene.

20. The additive composition of claim 19 wherein the carboxylic acid acylating agent is selected from acrylic acid, alkyl-substituted acrylic acid, maleic acid, fumaric acid, crotonic acid, citraconic acid, itaconic acid, mesaconic acid, the lower alkyl esters thereof, the anhydrides thereof, and mixtures of two or more of any of said acids, esters and anhydrides.

21. An additive composition comprising the reaction products prepared by the process which comprises the steps of:
(A) reacting in the absence of free radical initiators and at about 150° to about 280° C. one or more terpolymers of ethylene, propylene, and a non-conjugated diene with at least one olefinic unsaturated carboxylic acid or anhydride, to form thereby one or more reaction intermediates, said terpolymers having an inherent viscosity of about 0.7 to about 2.0 as measured on a 0.1 weight percent in carbon tetrachloride at 30° C., and wherein said terpolymers are formed each from about 30 to about 85 mole percent ethylene, from about 15 to about 70 mole percent propylene, and from about 0.5 to about 20 mole percent non-conjugated diene; and
(B) reacting the reaction intermediates formed in (A) with a stoichiometric amount of an N-(aminoalkyl)morpholine at about 20° to about 280° C.

22. The additive composition of claim 21 wherein the carboxylic acid or anhydride is selected from the group consisting of mono-, di-, or polycarboxylic acids, the anhydrides thereof, and mixtures of two or more of said acids or anhydrides.

23. The additive composition of claim 22 wherein in step (A) the reaction is carried out at a temperature from about 180° to about 250° C. and the reaction in (B) is carried out at a temperature from about 100° to about 280° C.

24. The additive composition of claim 23 wherein the olefinic unsaturated carboxylic acid or its anhydride is selected from the group consisting of acrylic acid, methacrylic acid, maleic acid, fumaric acid, crotonic acid, citraconic acid, itaconic acid, mesaconic acid, their anhydrides and mixtures of two or more of any of said acids and anhydrides.

25. The additive composition of claim 23 wherein the non-conjugated diene of said terpolymer is a non-conjugated diolefin of 6 to 8 carbon atoms.

26. The additive composition of claim 23 wherein the non-conjugated diene is selected from 1,4-hexadiene, 5-methylene-2-norbornene, 1,5-heptadiene, dicyclopentadiene, 1,4-cyclohexadiene, 5-ethylidene-2-norbornene, 1,6-octadiene, and mixtures of two or more of any of said dienes.

27. The additive composition of claim 25 wherein the non-conjugated diolefin is characterized by the presence of a maximum of one vinyl group —HC=CH$_2$.

28. The additive composition of claim 27 wherein the reaction of step (B) is conducted at about 150° to about 220° C.

29. The additive composition of claim 27 wherein the terpolymer in (A) is formed from about 30 to about 70 mole percent ethylene, from about 30 to about 70 mole percent propylene, and from about 1 to about 15 mole percent of the non-conjugated diolefin.

30. The additive composition of claim 29 wherein the non-conjugated diolefin is 1,4-hexadiene.

31. The additive composition of claim 30 wherein the terpolymer in (A) is formed from about 40 to about 60 mole percent ethylene, about 40 to about 60 mole percent propylene and from about 2 to about 10 mole percent 1,4-hexadiene.

32. The additive composition of claim 31 wherein the carboxylic acid or anhydride is maleic acid, its anhydride or mixtures thereof.

33. The additive composition of claim 30 wherein the terpolymer is about 45 to about 55 mole percent ethylene, about 45 to about 55 mole percent propylene, and about 2 to about 5 mole percent 1,4-hexadiene.

34. The additive composition of claim 33 wherein the N-(aminoalkyl)morpholine is N-(3-aminopropyl)morpholine.

35. The method of improving the viscosity-temperature relationship and dispersancy of a lubricating oil which comprises incorporating into said oil an effective minor amount of the additive composition of claim 1.

36. The method of improving the viscosity-temperature relationship and dispersancy of a lubricating oil, which comprises incorporating into said oil an effective minor amount of the additive composition of claim 10.

37. The method of improving the viscosity-temperature relationship and dispersancy of a lubricating oil, which comprises incorporating into said oil an effective minor amount of the additive composition of claim 21.

38. The method of improving the viscosity-temperature relationship and dispersancy of a lubricating oil, which comprises incorporating into said oil an effective minor amount of the additive composition of claim 27.

39. The method of improving the viscosity-temperature relationship and dispersancy of a lubricating oil, which comprises incorporating into said oil an effective minor amount of the additive composition of claim 30.

40. The method of improving the viscosity-temperature relationship and dispersancy of a lubricating oil, which comprises incorporating into said oil an effective minor amount of the additive composition of claim 34.

41. An additive concentrate comprising a substantially inert, normally liquid organic diluent and about 2 to about 40% by weight of at least one additive composition of claim 1.

42. An additive concentrate comprising a substantially inert, normally liquid organic diluent and about 2 to about 40% by weight of at least one additive composition of claim 9.

43. An additive concentrate comprising a substantially inert, normally liquid organic diluent and about 2 to about 40% by weight of at least one additive composition of claim 10.

44. An additive concentrate comprising a substantially inert, normally liquid organic diluent and about 2 to about 40% by weight of at least one additive composition of claim 21.

45. An additive concentrate comprising a substantially inert, normally liquid organic diluent and about 2 to about 40% by weight of at least one additive composition of claim 30.

46. An additive concentrate comprising a substantially inert, normally liquid organic diluent and about 2 to about 40% by weight of at least one additive composition of claim 34.

47. A lubricant composition comprising a major proportion of a lubricating oil and a minor effective amount of one or more additives according to claim 1.

48. A lubricant composition comprising a major proportion of a lubricating oil and a minor effective amount of one or more additives according to claim 9.

49. A lubricant composition comprising a major proportion of a lubricating oil and a minor effective amount of one or more additives according to claim 10.

50. A lubricant composition comprising a major proportion of a lubricating oil and a minor effective amount of one or more additives according to claim 20.

51. A lubricant composition comprising a major proportion of a lubricating oil and a minor effective amount of one or more additives according to claim 21.

52. A lubricant composition comprising a major proportion of a lubricating oil and a minor effective amount of one or more additives according to claim 34.

* * * * *